(12) United States Patent  (10) Patent No.: US 6,685,232 B2
Sampson  (45) Date of Patent: Feb. 3, 2004

(54) BANJO CLIP FOR FLANGE HEAD FLOW BOLT

(75) Inventor: James M. Sampson, Southfield, MI (US)

(73) Assignee: Franklin Fastener Company, Redford Township, MI (US)

( * ) Notice: Subject to any disclaimer, the term of this patent is extended or adjusted under 35 U.S.C. 154(b) by 0 days.

(21) Appl. No.: 10/236,239

(22) Filed: Sep. 6, 2002

(65) Prior Publication Data

US 2003/0042737 A1 Mar. 6, 2003

Related U.S. Application Data

(60) Provisional application No. 60/317,663, filed on Sep. 6, 2001.

(51) Int. Cl.[7] ............................ F16L 41/00; F16B 43/00
(52) U.S. Cl. .......................... 285/190; 285/23; 411/533
(58) Field of Search ................................. 285/190, 191, 285/23; 411/999, 533, 174, 175

(56) References Cited

U.S. PATENT DOCUMENTS 2,771,113 A * 11/1956 Flora ........................... 411/175
4,729,706 A * 3/1988 Peterson et al. ............. 411/175
5,011,192 A * 4/1991 Campo ......................... 285/190
5,403,042 A * 4/1995 Negron ......................... 285/12

* cited by examiner

Primary Examiner—David Bochna
(74) Attorney, Agent, or Firm—Brooks Kushman P.C.

(57) ABSTRACT

A clip for assembling a module comprising a flange head bolt, and a member that receives the flange head bolt. The clip has an inner washer and an outer washer that are joined by a bridging portion. The outer washer has a retainer tub that engages the flange of the flange head bolt. The clip may be referred to as a banjo clip when it is used with a banjo block that connects a brake line to a brake caliper.

20 Claims, 2 Drawing Sheets

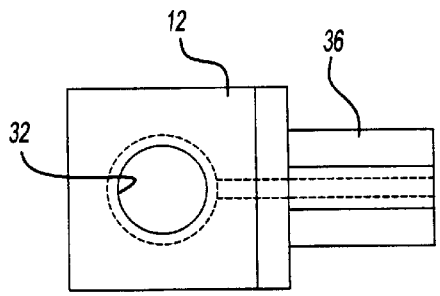
Fig-3
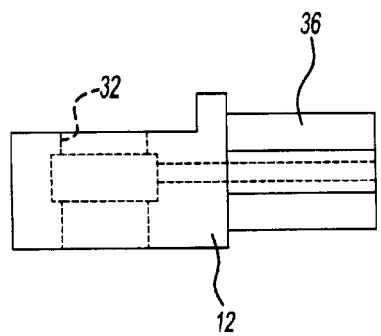
Fig-4
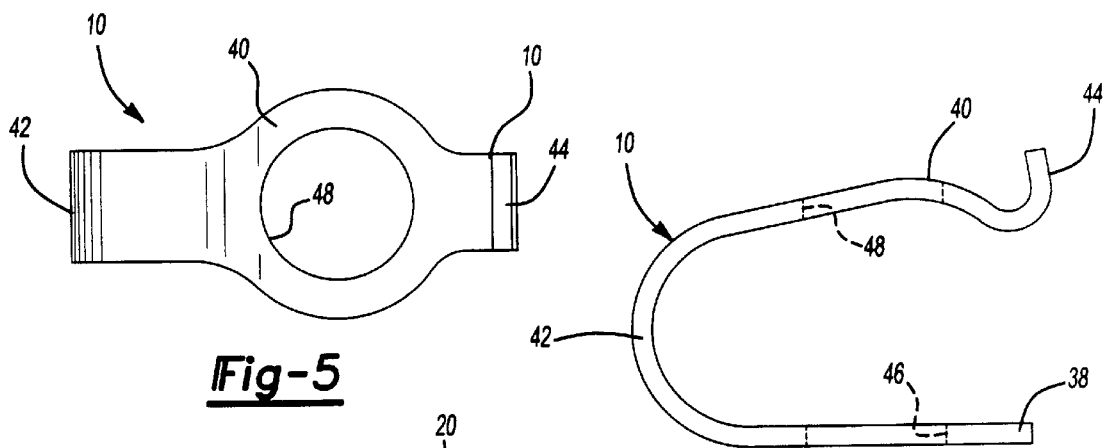
Fig-5
Fig-6
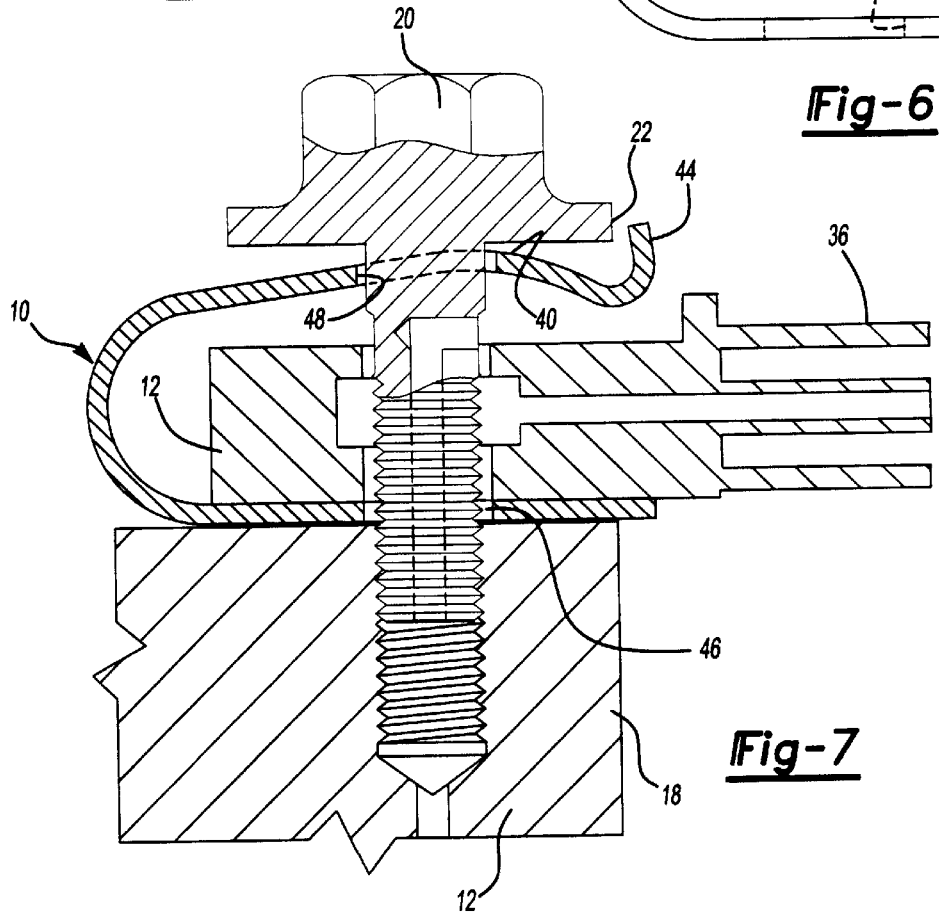
Fig-7

BANJO CLIP FOR FLANGE HEAD FLOW BOLT

CROSS-REFERENCE TO RELATED APPLICATIONS

This application claims the benefit of U.S. provisional application Ser. No. 60/317,663 filed Sep. 6, 2001.

BACKGROUND OF THE INVENTION

1. Field of the Invention

The present invention relates to a clip for captivating a bolt in an assembly and more particularly relates to a banjo clip connecting a banjo block to a flow bolt that connects a brake line to a brake caliper.

2. Background Art

Fasteners are used to assemble parts together and attach them to a mounting surface. Frequently washers are used in conjunction with fasteners as part of an assembly to provide a broader bearing surface for the fastener head or nut and to inhibit loosening of the fastener as a result of part rotation or vibration. In some instances, washers may also serve as a fluid seal. One problem with separate washers and bolts is that assembly of them to other members requires manual dexterity and assembly time. Washers may become separated from the bolts especially when the washers are preassembled to the bolt prior to being assembled to another part.

One example of a part that uses washers for hydraulic sealing is a connector for connecting a brake line to a disc brake caliper. Copper washers are used to form a seal when a bolt secures the connector to the brake caliper. There are a wide variety of other assembly operations for which washers are required but make the assembly operation more difficult requiring a greater degree of manual dexterity in the assembly process.

Vehicle brakes generally include brake calipers to which brake fluid is ported through a brake line. One popular approach to brake design features brake calipers that are connected to the brake line by means of a flow bolt and banjo block. Such prior art brake systems include a flow bolt that is secured by means of a threaded connection to the brake caliper. The brake line is connected to a banjo block by means of a tube segment on which the brake line is received. The tube has an opening through which brake fluid is provided to an annular passageway through which fluid is ported to one or more ports in the flow bolt. Brake fluid passes through the port in the flow bolt and through an axially oriented passageway extending to the tip of the flow bolt where it provides fluid to the brake caliper mechanism. To minimize leakage, copper washers are generally provided on opposite axially facing sides of the banjo block thereby forming a high pressure seal on both sides of the banjo block when the flange head flow bolt is tightened.

One disadvantage of the above brake line to brake caliper fitting is that it involves a complicated vehicle assembly technique requiring multiple parts to be assembled on the line. The banjo block must be assembled to the brake line and the flow bolt must be inserted through the two washers and banjo block prior to assembling the flow bolt to the brake caliper. This approach requires additional parts that must be carried as inventory items. Pre-assembly of the washers, banjo block and flow bolt is not feasible with prior art systems because the parts could become separated from each other during shipment or storage.

Another disadvantage of the prior art system is that when the copper washers are press fit or coined to assemble them to the banjo block during press fitting or coining, metal shavings could be created that must be removed prior to assembly of the flow bolt to the brake caliper.

Crimping the copper washers to the bolt can also cause work hardening of the washers that may adversely affect the sealing performance of the washers. If a good seal is not maintained, brake fluid may leak from the flow bolt, resulting in warranty claims.

There is a need for an easy-to-assemble high pressure fluid connection between brake lines and brake calipers, or in other pressurized fluid connection applications. A modular flow bolt, banjo block, and banjo clip is needed that can simply be connected to the brake caliper and then connected to the brake line to simplify vehicle assembly operations.

There is also a need for an improved banjo block connector that does not require coining copper washers to the bolt.

In addition, there is a need for an indicator that can indicate if a flow bolt of a brake caliper has been improperly installed by over-tightening and that could indicate tampering with the flow bolt.

The above prior art system is improved and problems associated with the prior art are addressed by the present invention as summarized below.

SUMMARY OF THE INVENTION

According to one aspect of the present invention a banjo clip assembly is provided that includes a bolt having a head that is formed with a flange, a member having a central opening for receiving the bolt, and a banjo clip comprising an inner washer portion and an outer washer portion that are joined together by a bridging portion. The outer washer has a crimp tab that secures the banjo clip to the bolt when the bolt is inserted through the outer washer, the member, and inner washer. The crimp tab engages the flange and secures the bolt, the member, and the banjo clip together.

Other aspects relating to the banjo clip assembly that include the banjo clip may hold the bolt together with the member while the bolt is rotatable relative to the member and the banjo clip. In addition, the banjo clip may establish a fluid seal between one or both of the washers and the member when the bolt is tightened against the washers and the member. The fluid seal may be either a high pressure hydraulic fluid seal, a pneumatic seal, or other fluid seal. The banjo clip may be formed from a wide variety of materials including, but not limited to, copper, steel, aluminum, bronze or polymeric materials. The banjo clip assembly may be, for example, a brake caliper banjo, a component of a fuel injection system, or the like.

According to another aspect of the invention a fluid coupling is provided for connecting a brake line to a brake caliper on a vehicle brake system. The fluid coupling includes a flow bolt comprising a bolt having a fluid passageway connecting the brake line to the brake caliper. The flow bolt has a head that is formed with a flange. A banjo block having a brake line receptacle, a threaded opening and an internal passageway formed in the threaded opening that encircles the flow bolt. Brake fluid is free to flow from the brake line through the banjo block and the flow bolt to the brake caliper. The banjo clip may comprise an inner washer portion and an outer washer portion that are joined together by a bridging portion. The outer washer may have a crimp retainer. The fluid coupling as established by the flow bolt being inserted through the outer washer, the banjo block and the inner washer with the crimped retainer being formed over the flange of the flow bolt that secures the banjo clip to the flow bolt and the flow bolt to the banjo block.

According to another aspect of the invention the flow bolt may have a threaded shaft extending from the head to a distal end of the flow bolt. A central bore extends coaxially through a portion of the shaft. A radially extending bore is provided between the central bore and a fluid passage defined in the banjo block. The banjo block may have a tubing receptacle defining a fluid port and a threaded opening for receiving the flow bolt. An angular internal passageway is provided that is in fluid flow communication with the fluid port. The flow bolt may have a threaded shaft extending from its head to a distal end and a central bore extending coaxially through the portion of the shaft. A radially extending bore connects the central bore to the internal passageway defined in the banjo block.

According to another of the invention, a clip assembly is provided that secures together a bolt and fluid coupling member having a threaded opening for receiving the bolt. The clip comprises inner and outer washer portions that are joined by a bridging portion. The outer washer has a crimp tab formed thereon so that when the bolt is inserted through the outer washer, the fluid coupling and the inner washer, the crimp tab engages the flange to loosely secure the fluid coupling to the bolt.

According to other aspects relating to a clip assembly, the clip is adapted to hold the bolt together with the fluid coupling wherein the bolt is rotatable relative to the fluid coupling and clip. The clip may be required to create a fluid seal between at least one of the washers and the fluid coupling when the bolt is tightened against the washer and the fluid coupling. The fluid coupling may be a disc brake component part or a component of a fuel injection system.

According to another aspect of the present invention, a fluid coupling is provided for connecting a brake line to a brake caliper of a vehicle brake system. A flange head flow bolt comprising a bolt having a fluid passageway for connecting the brake line to the brake caliper for fluid flow communication. The flange head flow bolt has a head that is formed with a flange. A banjo block is provided that has a brake line receptacle, a threaded opening, and an internal passageway formed in the threaded opening that encircles the flange head flow bolt. Brake fluid flows from the brake line through the banjo block and the flange head flow bolt to the brake caliper. A banjo clip is provided that comprises an inner washer portion and an outer washer portion that are joined by a bridging portion. The outer washer is formed with a crimp retainer tab. The flange head flow bolt is inserted through the outer washer, the banjo block and the inner washer with the crimp retainer being formed over the flange of the flange head flow bolt to secure the flow bolt, banjo block, and banjo clip together.

These and other aspects and features of the invention will be better understood by one of ordinary skill in the art in view of the attached drawings and following detailed description of the best mode for practicing the invention.

BRIEF DESCRIPTION OF THE DRAWINGS

FIG. 3 is a top plan view of the banjo block;

FIG. 4 is a side elevation view of the banjo block;

FIG. 5 is a plan view of the top portion of the banjo clip;

FIG. 6 is a side elevation view of the banjo clip; and

FIG. 7 is a partial cross-section view of the banjo clip, banjo block, and flow bolt prior to tightening the flow bolt.

DETAILED DESCRIPTION OF THE PREFERRED EMBODIMENT(S)

Figure 1:
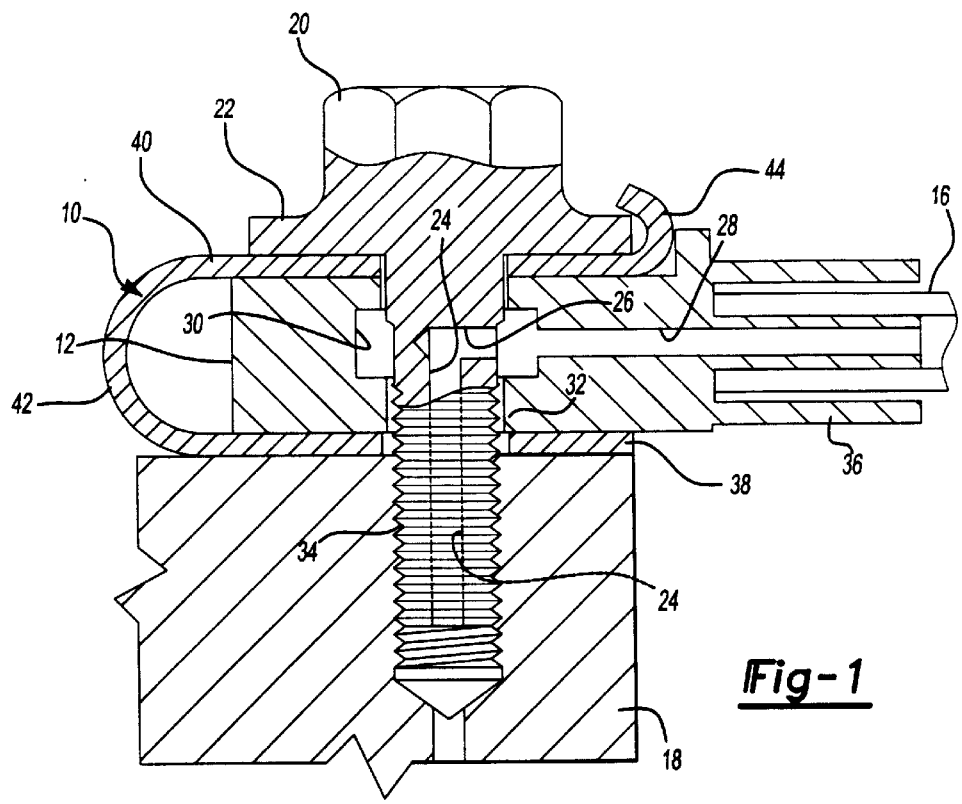
FIG. 1 is a cross-section view of a flange head flow bolt connected to a banjo block by a banjo clip wherein the banjo block is shown connected to a brake line while the flange head flow bolt is connected to a brake caliper.
Figure 2:
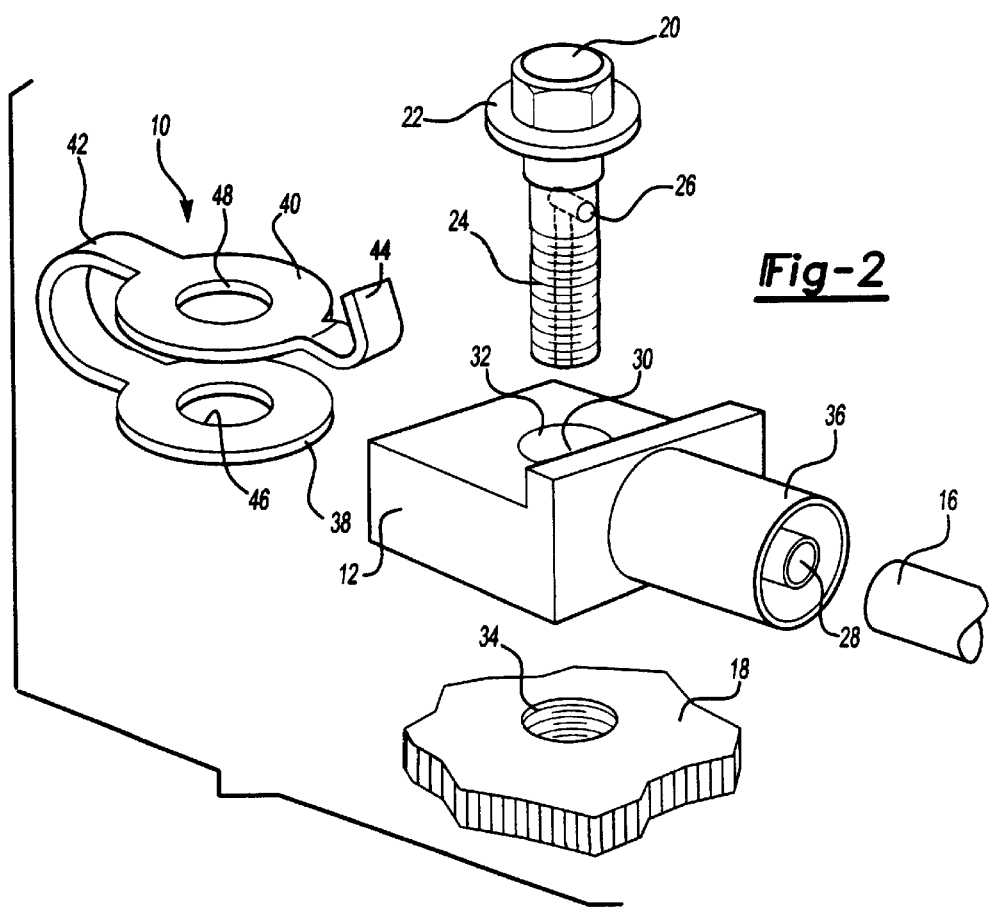
FIG. 2 is an exploded perspective view showing the flow bolt, banjo block, banjo clip, brake line, and partially showing a brake caliper.

Referring now to the drawings, and in particular FIGS. 1 and 2, a banjo clip 10 is shown with a banjo block 12. The banjo block 12 is a fluid coupling that defines ports and passageways for brake fluid. While the invention is described with reference to a brake caliper application, the invention is also potentially applicable to other fasteners and fluid couplings. For example, the invention could also be used with fuel injection systems or air brake systems. The banjo block 12 connects a brake line 16 of a vehicle (not shown) to a brake caliper 18 that is fragmentarily shown. A flow bolt 20 having a flange 22 defines an axial passageway 24 and a radial port 26. The banjo block 12 has an internal passageway 28 in fluid flow communication with an annular groove 30 formed in a threaded opening 32 of the banjo block 12. The flow bolt 20 is received in the threaded opening 32 of the banjo block 12 to form a subassembly or module comprising the banjo clip 10, banjo block 12, and flow bolt 20.

The module formed by banjo block 12, banjo clip 10 and flow bolt 20 is installed on the brake caliper 18 in a threaded receptacle 34 formed on the brake caliper 18. The banjo block 12 also includes a brake line receptacle 36 to which the brake line 16 is connected. Brake fluid (not shown) may be ported from the brake line 16 through the internal passageway 28 in the banjo block 12 and in turn to the annular groove 30. Annular groove 30 is aligned with the radial port 26 of the flow bolt 20 when the flow bolt 20 is fully assembled to the banjo block 12. Fluid flows from the annular groove 30 through the radial port 26 and into the axial passageway 24. Brake fluid in the axial passageway 24 is in fluid flow communication with the brake caliper 18 through the threaded receptacle 34 of the brake caliper 18.

The banjo clip 10 has an inner washer 38 and an outer washer 40 that are connected by a bridging portion 42. A retainer 44 is formed on the outer washer 40 that engages and retains the flow bolt 20 on the banjo block 12 by capturing the flange 22 of the flow bolt 20. The inner washer 38 has an opening 46 and the outer washer 40 has an opening 48 through which the flow bolt 20 is inserted after banjo clip 10 is assembled to the banjo block 12. If the flow bolt 20 is over-tightened or tampered with, the bridging portion 42 will be twisted. Twisting of the bridging portion 42 functions as a tell-tale as to improper installation and may allow for verification of warranty claims.

Referring now to FIGS. 3 and 4, the banjo block 12 is shown to include a threaded opening 32 and receptacle 36 that are oriented perpendicularly to each other in the illustrated embodiment.

Referring now to FIGS. 5 and 6, the banjo clip 10 is generally indicated and is shown to include an inner washer 38 and outer washer 40. As shown in FIG. 6, the banjo clip 10 is shown in its preassembly condition wherein the inner and outer washers 38, 40 diverge from the bridging portion 42. The outer washer 40 is contoured to cause the retainer 44 to engage the flange 22 of the flow bolt 20 as will be better understood in reference to FIGS. 1 and 7 below.

Referring now to FIGS. 1 and 7, with particular reference to FIG. 7, the flow bolt 20 is shown loosely assembled to the banjo clip 10 and banjo block 12 prior to engagement of the retainer 44 with the flange 22. As the flow bolt 20 is secured to the brake caliper 18, the outer washer 40 is pressed against the banjo block 12 causing the retainer 44 to be rotated to a position as shown in FIG. 1 wherein the retainer 44 encompasses the flange 22 of the flow bolt 20. As shown in FIG. 1, the banjo clip 10, banjo block 12 and flow bolt 20 are secured together as a modular unit to the brake caliper 18 during the assembly of a vehicle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A banjo clip assembly, comprising:
   a bolt having a head that is formed with a flange;
   a member having a threaded opening for receiving the bolt;
   a banjo clip comprising an inner washer portion and an outer washer portion that are joined by a bridging portion, the outer washer having a crimp tab formed thereon; and
   wherein the bolt is inserted through the outer washer, the member, and the inner washer, with the crimp tab securing the banjo clip to the bolt by engaging the flange and thereby securing the bolt, member and banjo clip together.

2. The banjo clip assembly of claim 1 wherein the banjo clip holds the bolt together with the member with the bolt being rotatable relative to the member and the banjo clip.

3. The banjo clip assembly of claim 1 wherein the banjo clip creates a fluid seal between at least one of the washers and the member when the bolt is tightened against the at least one washer and the member.

4. The banjo clip assembly of claim 3 wherein the fluid seal is a high pressure hydraulic fluid seal.

5. The banjo clip assembly of claim 3 wherein the fluid seal is a pneumatic seal.

6. The banjo clip assembly of claim 1 wherein the banjo clip is formed from a material consisting essentially of one of the following:
   copper;
   steel;
   aluminum;
   bronze; or
   polymeric material.

7. The banjo clip assembly of claim 1 wherein the member is a brake caliper banjo block.

8. The banjo clip assembly of claim 1 wherein the member is a component of a fluid delivery system.

9. The banjo clip assembly of claim 1 wherein the member is a disc brake component part and the flange head bolt is a flow bolt that provides a fluid passageway through the disc brake component part and the inner and outer washers form a seal with the member when the flange head bolt is tightened against a disc brake assembly.

10. A fluid coupling for connecting a brake line to a brake caliper of a vehicle brake system, comprising:
    a flow bolt comprising a bolt having a fluid passageway connecting the brake line to the brake caliper, the flow bolt having a head that is formed with a flange;
    a banjo block having a brake line receptacle, a threaded opening, and an internal passageway formed in the threaded opening that encircles the flow bolt wherein brake fluid may flow from the brake line through the banjo block and the flow bolt to the brake caliper;
    a banjo clip comprising an inner washer portion and an outer washer portion that are joined by a bridging portion, the outer washer having a crimp retainer formed thereon; and
    wherein the flow bolt is inserted through the outer washer, the banjo block, and the inner washer, with the crimp retainer being formed to secure the banjo clip to the flow bolt by engaging the flange and thereby securing the flow bolt, banjo block and banjo clip together as a module.

11. The fluid coupling of claim 10 wherein the flow bolt has a threaded shaft extending from the head to a distal end, a central bore extending coaxially through a portion of the shaft portion, and a radially extending bore connecting the central bore to a fluid passage defined in the banjo block.

12. The fluid coupling of claim 10 wherein the banjo block has a tubing receptacle having a fluid port, a threaded opening for receiving the flow bolt, and an annular internal passageway that is in fluid flow communication with the fluid port.

13. The fluid coupling of claim 12 wherein the flow bolt has a threaded shaft extending from the head to a distal end, a central bore extending coaxially through a portion of the shaft portion, and a radially extending bore connecting the central bore to the internal passageway defined in the banjo block.

14. The fluid coupling of claim 10 wherein the banjo clip holds the flow bolt together with the banjo block with the bolt being rotatable relative to the banjo block and the banjo clip.

15. The fluid coupling of claim 10 wherein the banjo clip creates a fluid seal between at least one of the washers and the banjo block when the flow bolt is tightened against the at least one washer and the banjo block.

16. A clip assembly, comprising:
    a bolt having a head that is formed with a flange;
    a fluid coupling having a threaded opening for receiving the bolt;
    a clip comprising an inner washer portion and an outer washer portion that are joined by a bridging portion, the outer washer having a crimp tab formed thereon; and
    wherein the bolt is inserted through the outer washer, the fluid coupling, and the inner washer, with the crimp tab engaging the flange to loosely secure the clip to the bolt thereby securing the bolt, fluid coupling and clip together.

17. The clip assembly of claim 16 wherein the clip holds the bolt together with the fluid coupling with the bolt being rotatable relative to the fluid coupling and the clip.

18. The clip assembly of claim 16 wherein the clip creates a fluid seal between at least one of the washers and the fluid coupling when the bolt is tightened against the at least one washer and the fluid coupling.

19. The clip assembly of claim 16 wherein the fluid coupling is a disc brake component part and the bolt has a fluid passageway that permits fluid flow through the disc brake component part and the inner and outer washers form a seal with the fluid coupling when the bolt is tightened against a disc brake assembly.

20. The clip assembly of claim 16 wherein the fluid coupling is a component of a fluid delivery system.

* * * * *